(12) United States Patent
Cedilnik

(10) Patent No.: US 11,320,302 B2
(45) Date of Patent: May 3, 2022

(54) HIGH-RATE DISTRIBUTED ACOUSTIC SENSING USING HIGH-POWER LIGHT PULSES

(71) Applicant: AiQ Dienstleistungen UG (haftungsbeschränkt), Böblingen (DE)

(72) Inventor: Gregor Cedilnik, Gäufelden (DE)

(73) Assignee: AiQ Dienstleistungen UG (haftungsbeschränkt), Böblingen (DE)

( * ) Notice: Subject to any disclaimer, the term of this patent is extended or adjusted under 35 U.S.C. 154(b) by 314 days.

(21) Appl. No.: 16/596,333

(22) Filed: Oct. 8, 2019

(65) Prior Publication Data

US 2020/0116556 A1 Apr. 16, 2020

(30) Foreign Application Priority Data

Oct. 16, 2018 (GB) ...................................... 1816836

(51) Int. Cl.
*G01H 9/00* (2006.01)
*G01D 5/353* (2006.01)

(52) U.S. Cl.
CPC ......... *G01H 9/004* (2013.01); *G01D 5/35361* (2013.01)

(58) Field of Classification Search
CPC ........................... G01H 9/004; G01D 5/35361
See application file for complete search history.

(56) References Cited

U.S. PATENT DOCUMENTS

| | | | |
|---|---|---|---|
| 6,542,228 B1 | 4/2003 | Hartog | |
| 8,005,323 B2 | 8/2011 | Farhadiroushan et al. | |
| 2006/0210269 A1* | 9/2006 | Farhadiroushan | G01K 11/32 398/48 |
| 2011/0280277 A1* | 11/2011 | Chung | G01K 11/32 374/137 |
| 2016/0146662 A1 | 5/2016 | Stokely et al. | |

(Continued)

FOREIGN PATENT DOCUMENTS

| | | |
|---|---|---|
| EP | 1 912 049 A1 | 4/2008 |
| GB | 2416587 A | 2/2006 |
| GB | 2570144 A | 7/2019 |

(Continued)

OTHER PUBLICATIONS

Extended European Search Report in EP Application No. 19201859.6; dated Mar. 18, 2020; pp. 1-7; European Patent Office, 80298, Munich, Germany.

(Continued)

*Primary Examiner* — Dominic J Bologna
(74) *Attorney, Agent, or Firm* — Robert A. Blaha; Smith Tempel Blaha LLC

(57) ABSTRACT

An arrangement for high rate fiber optical distributed acoustic sensing includes an optical fiber, a light launch module adapted to inject a first coherent light pattern into the optical fiber and to inject a second coherent light pattern into the optical fiber while first Rayleigh backscatter light of the first light pattern is propagating in the optical fiber, wherein the first coherent light pattern and the second coherent light pattern have a light pattern power above a nonlinear effect related power limit; and a detector adapted to detect the first Rayleigh backscatter light and to detect second Rayleigh backscatter light of the second light pattern.

17 Claims, 5 Drawing Sheets

(56) References Cited

U.S. PATENT DOCUMENTS

2016/0169768 A1 6/2016 Handerek
2017/0211970 A1* 7/2017 Milione ................ G01H 9/004

FOREIGN PATENT DOCUMENTS

| WO | 2012095640 A2 | 7/2012 |
| WO | 2015180786 A1 | 12/2015 |
| WO | 2017009606 A1 | 1/2017 |

OTHER PUBLICATIONS

McMichael, Conor, Search Report Under Section 17(5) in Application GB181683.6; dated Apr. 16, 2019, pp. 1-3, Intellectual Property Office, Newport, South Wales, UK.

* cited by examiner

HIGH-RATE DISTRIBUTED ACOUSTIC SENSING USING HIGH-POWER LIGHT PULSES

TECHNICAL FIELD

Embodiments of the present invention generally relate to a method and an arrangement for high rate fiber optical distributed acoustic sensing.

TECHNOLOGICAL BACKGROUND

In optical time domain reflectometry type measurements, which includes DTS (Distributed Temperature Sensing) and DAS (Distributed Acoustic Sensing), light pulses are sent into a fiber and elastic or inelastic scattered light (with/out wavelength shift) created during pulse propagation through the fiber and interaction with the fiber material, part of which reaching back to a detector of the optical time domain reflectometer (OTDR), is analyzed. This backscattered light carries information of interest (like temperature or strain). Via the time of flight monitoring from pulse launch time to detection time, the detected signal from the backscattered light can be assigned to a distance along the fiber. The measurement result can be depicted as a curve of the quantity of interest versus distance along the fiber.

The backscatter light is a stream that lasts until the light pulse reaches the fiber end and the backscatter light is incident on the detector. A next light pulse is injected into the fiber when (after) the previous stream ends. This avoids that two light signals from different fiber locations reach the detector at the same time, assuring that by the time of flight a corresponding fiber location can be assigned to the detector signal unambiguously and without interference between light signals from different locations. The length of the fiber therefore limits the maximum possible light pulse rate. Longer fiber requires lower pulse rate (e.g., a 50 km fiber allows a maximum 2 kHz pulse rate).

There are different variations of DAS architecture, working with single pulses, double pulses or pulse codes of same or different optical frequencies, with or without a local oscillator that may be shifted in optical frequency compared to the frequency of the injected light pulse(s). The receiver path (e.g. from circulator to photodetector) may be polarization independent (neutral) or may handle different polarizations differently. In all cases, strain changes on the fiber affect the signal reaching the signal processor which then extracts information about the strain event.

US 2006/0210269 A1 discloses a distributed temperature sensor using Raman scattering in optical fibers to determine the temperature. Due to losses in the optical fiber, the resolutions of the temperature become poor, as the fiber length increases. A pulse conversion method is described, to maximize the result and pulse energy while the power is kept below a SRS threshold. Pulses of suitable shape to cause a controlled conversion of the pulses to a different wavelength are transmitted through the optical fiber. Due to nonlinear effects, after a short transition length, all the original light is converted to a new wavelength. The distance limit can be raised for a given level of sensing accuracy or resolution, since the launch power can be much greater and so returned optical signals returned from greater distances along the fiber can be detected. The launch power can be arranged such that different parts of the fiber are illuminated at more than one different wavelength, and the receiving means can be arranged to distinguish the returning optical signals at each of the different wavelengths. The pulses can be timed so that when a first pulse has been converted to the different wavelength, a succeeding pulse can be sent. The backscatter from the succeeding pulse can now be distinguished at the receiver from the desired backscatter from the first pulse at the different wavelength, by appropriate filtering. This can enable an increase in the repetition rate of the pulses to further improve the sensing accuracy. However, using filters to separate different wavelength light increases the complexity and costs of the system.

EP 1 912 049 A1 discloses an apparatus for acoustic sensing using multiple optical pulses, wherein at least four pulse-modulated electromagnetic waves each having an associated frequency are launched into a medium. The energy scattered via the medium is detected and may be used to determine a characteristic of the environment of the medium. Again, separating, distinguishing and detecting light having different frequency, increases the complexity of the system.

US 2016/0146662 A1 discloses systems for spread spectrum distributed acoustic sensor monitoring, wherein a continuous wave laser light source is used and the continuous wave output of the laser light source is modulated with pseudo-random binary sequence codes. To guarantee efficient spread-spectrum communication, the pseudo-random number sequences must respect certain rules, such as length, auto-correlation, cross-correlation, orthogonality, correlation side lobe behavior and bits-balancing. Thereby, definition and generation of the wave output of the laser light source is complicated and requires a number of appropriate light shapers.

Thus, it has been observed that the conventional systems in particular have disadvantages due to the limitation in the pulse rate at which distributed acoustic sensing can be performed or methods to increase the pulse rate are complicated and require complex equipment. Unwanted consequences of the limitation in the pulse rate are discussed below:

SNR: A limited pulse rate limits the signal to noise ratio (SNR) of the OTDR type measurement, because a limited pulse rate limits the number of traces that can be averaged during a given time span. In contrast at high pulse rate, many noise contributors are averaged out by repeated pulse measurement. E.g. a DTS can send up to 20 k pulses into a 50 km fiber during 10 s of measurement time, i.e. average 20 k pulse response curves for a temperature calculation. Note that for best SNR, a signal as strong as possible is advantageous to keep some noise sources like detector noise or shot noise low compared to the signal. This can be achieved by maximizing the power of the pulse sent into the fiber. However, exceeding the pulse power beyond certain limits lead to the onset of nonlinear effect during pulse propagation.

U.S. Pat. No. 6,542,228 teaches that the power which may be launched into an optical fiber is limited by nonlinear effects, which result from the interaction of high-intensity light with the glass forming the structure of the fiber, including stimulated Raman or Brillouin scattering and self-phase modulation. Additionally, effects are known from textbook like modulation instability, which is attenuating the effective pulse energy (i.e. energy at the wavelength that affects the OTDR-type measurement), e.g. by shifting energy towards other optical frequencies after some distance of propagation. The effect is a loss of useful (effective) pulse energy and/or creation of spurious signals (like stimulated Raman scattering in the case of Raman DTS) which falsifies the signal of interest (e.g. changes the signal power in the Stokes wavelength band which affects the calculated temperature).

Bandwidth: In the case of DAS, a limited pulse rate leads to a limited acoustic bandwidth, because it limits the rate at which an acoustic event close to or on the fiber is sampled and thus limits the Nyquist frequency which is half the sampling rate. For example, a pulse rate of max. 2 kHz on a 50 km fiber limits the acoustic bandwidth to 1 kHz, signals beyond that frequency get frequency shifted, conventionally into the 1 kHz band, in the measurement result.

Dynamic range: In coherent-OTDR type instruments, especially DAS, strain causes changes of the optical path length to and from scatter centers in the fiber which affects the optical phase of respective backscattered light. Detection of the optical phase of light, usually by a kind of interferometer converting phase into detector intensity, is limited to a range of 2 pi. Such an interferometer can be realized by interference with backscattered light from other parts of the fiber and/or with a local oscillator (reference light) in c-OTDR. Therefore, determination of the change of the phase from pulse to pulse is also limited to that range, e.g. to a band of +/−pi. A phase change at a fiber location or range exceeding the expected band, e.g. 1.5 pi, cannot be distinguished from a phase change within that band, e.g. −0.5 pi, as both create the same signal on the detector. In terms of strain, in this example, it cannot be resolved if the fiber is stretched or compressed during the time between two pulses. Integrating strain changes over consecutive pulses, i.e. over time leads to errors whenever the expected band is exceeded, so the reconstructed acoustic wave is distorted, generally adding higher frequency components like higher harmonics. Thus, a limited pulse rate limits the detectable acoustic amplitude, depending on the acoustic frequencies.

SUMMARY

Thus, there may be a need for a method and for an arrangement of high rate fiber optical distributed acoustic sensing, wherein complexity of the system can be kept low, while acoustic bandwidth for distributed acoustic sensing can be increased compared to systems as known in the prior art.

The need may be satisfied by the subject-matter of the independent claims. The dependent claims specify particular embodiments of the present invention.

According to an embodiment of the present invention, it is provided a method of high rate fiber optical distributed acoustic sensing, the method comprising injecting a first coherent light pattern into an optical fiber; injecting a second coherent light pattern into the optical fiber while first Rayleigh backscatter light of the first light pattern is propagating in the optical fiber, wherein the first coherent light pattern and the second coherent light pattern have a light pattern power above a nonlinear effect related power limit; detecting the first Rayleigh backscatter light; and detecting second Rayleigh backscatter light of the second light pattern.

According to an embodiment of the present invention, it is provided an arrangement for high rate fiber optical distributed acoustic sensing, the arrangement comprising: an optical fiber; a light launch module adapted to inject a first coherent light pattern into an optical fiber and to inject a second coherent light pattern into the optical fiber while first Rayleigh backscatter light of the first light pattern is propagating in the optical fiber, wherein the first coherent light pattern and the second coherent light pattern have a light pattern power above a power limit where nonlinear effects of propagation occur; and a detector adapted to detect the first Rayleigh backscatter light and to detect second Rayleigh backscatter light of the second light pattern.

OVERVIEW OF EMBODIMENTS

The light patterns may for example be generated by a laser which passes through an acousto-optic modulator, which defines an intensity profile of the output light thereby defining the first and/or second light pattern. The first and the second light pattern may in particular be similar or substantially the same light patterns (having similar or same intensity profile over time). The optical fiber may comprise a glass core and a cladding comprising material having a lower refractive index than the material constituting the core of the optical fiber. Thereby, total internal refraction of the light propagating within the optical fiber may be achieved in order to reduce losses of light during propagation within the optical fiber.

The first backscatter light originates from the first coherent light pattern scattering at portions within the optical fiber, in particular at natural inhomogeneities in the matter causing Rayleigh scattering or portions of discontinuities or changes in the refractive index that are natural or are artificially fabricated. These inhomogeneities, discontinuities or changes of discontinuities in the optical index may shift due to acoustic disturbance of or around the acoustic fiber, causing variations of the optical path length from the instrument to and from respective backscatter centers. Thus, the first (second) Rayleigh backscatter light may give information regarding the optical path length change refractive index or change of refractive index at a considered position along the optical fiber at a first (second, later than the first) time point. The first (second) Rayleigh backscatter light has substantially the same wavelength as the first (second) lights of which the first (second) coherent light pattern is composed. Also, the second light forming the second coherent light pattern may have the same wavelength as the first light forming the first coherent light pattern.

Rayleigh backscattering involves elastic scattering, i.e. scattering without wavelength shift, and does not involve inelastic scattering. The first Rayleigh backscatter light (returning from the fiber) of the first light pattern has the same wavelength as the (injected) first light pattern. The second Rayleigh backscatter light (returning from the fiber) of the second light pattern has the same wavelength as the (injected) second light pattern. Further, the first light pattern may have the same wavelength as the second light pattern.

Thus, the method may use light of having only one wavelength, which is first injected and then detected. The first and the second Rayleigh backscatter light may have same wavelength. Thereby, there is no need for analyzing or separating returned light having different wavelengths for example or having different polarization state. Thereby, the complexity of the method and the corresponding arrangement may be reduced. However, due to nonlinear effects, a considerable amount of backscattered light may comprise wavelength(s) different from the wavelength of the injected light. This disturbing light having the different wavelength(s) may be filtered (reduced in intensity) before detection.

Nevertheless, a higher acoustic bandwidth is achieved than in the conventional systems. Different from conventional methods, for example the second coherent light pattern, is (already) launched or injected into the optical fiber, while the first Rayleigh backscatter light of the first light pattern is (still) propagating in the optical fiber (in a backward direction being opposite to the launching direction or injection direction). The first Rayleigh backscatter light originating from backscattering at positions of the optical fiber beyond an effective optical fiber length may have a very low intensity such that detection of also this backscatter light (and e.g. backscatter light from previous pulse(s) that may still be within the fiber) does not substantially disturb the detection of the second Rayleigh backscatter light. Because of injecting the first coherent light pattern with a light pattern power above the nonlinear related power limit, e.g. where nonlinear effects during propagating have a substantial influence, the intensity of the first light pattern drops beyond the effective optical fiber length to only a small fraction of the intensity of the originally injected first coherent light pattern, such that its backscatter may be neglected.

For detecting the first and/or second Rayleigh backscatter light a (same) photo detector may be utilized without (prior to detection) passing any wavelength filters. Thereby, in particular, a distributed acoustic sensing (DAS) method is provided which allows the sampling of the optical fiber with a higher pulse rate than a pulse rate conventionally used. Other embodiments may employ one or more wavelength filters (upstream of the detector) for removing light having wavelength(s) different from the wavelength of the injected light.

According to an embodiment of the present invention a highly coherent continuous wave laser is modulated (e.g. by an acousto-optic modulator (AOM)) to shape the pulse(s) and may be optically amplified (e.g. by an erbium-doped fiber amplifier (EDFA)), and may then be sent into the sensor fiber e.g. via a circulator. The backscatter from the sensor fiber may be directed to a third port of the circulator and may reach a photodetector for light intensity detection. In a certain architecture the backscatter signal may interfere with a part of the highly coherent radiation acting as a local oscillator.

The method may in particular be performed using a DAS system analyzing the Rayleigh backscatter which may be configured as a coherent optical time domain reflectometry system (c-OTDR). The launch power of the coherent light patterns (for example the first and the second light patterns) may be selected above the power limit, where nonlinear effects develop during light propagating along the fiber.

The nonlinear effect related power limit is a limit of energy per time of the injected respective light pattern. The maximal power (maximal power across the width or length of the light pattern) of the respective light patterns which are injected may be greater than the nonlinear effect related power limit.

The nonlinear effect related power limit may be a function of or may depend on a light pattern length (e.g. pulse length) and/or coherence length and/or wavelength of the light pattern and/or material and/or dimensions such as diameter and/or length of the optical fiber.

The nonlinear effect related power limit may correspond to the power of a light pattern beyond which nonlinear effects during propagation significantly reduce the intensity of the light having the wavelength of the injected light. The nonlinear effect related power limit may be experimentally determined given one or more of the above-mentioned influence factors. The power of injected light may be increased while measuring the light intensity at the relevant (initially injected) wavelength reaching the end of the fiber. While increasing the power of the injected light, the light intensity reaching the end of the fiber may increase until reaching a maximum. The associated power of the injected light may thereby define the nonlinear effect related power limit. If the power of the injected light is further increased (beyond the nonlinear effect related power limit) the light intensity at the relevant wavelength reaching the end of the fiber may not increase anymore or may even decrease.

According to another definition the nonlinear effect related power limit may be the power of light beyond which nonlinear effects (e.g. effects depending on a power of the electric field vector larger than one) exceed linear effects (e.g. effects depending linearly on the electric field vector).

Due to selecting the first light pattern power and the second light pattern power to be above the power limit, an effective fiber length that is shorter than the physical fiber length is achieved, since the respective light patterns are attenuated to only a small fraction of the initially injected intensity at and beyond the effective fiber length. Thereby, the effective fiber length may be considered to be the length, where the pulse power at the stimulus/launch frequency drops due to the nonlinear effects below a level of significant impact of its backscatter on the measurement. For example, a real (physical) fiber length may be 50 km, while the effective fiber length may be 10 km (depending on the first/second light pattern power).

Since the second coherent light pattern is already injected while first Rayleigh backscatter light of the first light pattern (and potentially even backscatter of more previously injected light patterns) is still propagating in the optical fiber, the pulse period (for pulses of same characteristic) is set below the fiber round-trip time. As a drawback of adjusting the first and the second coherent light pattern to have a light pattern power above the power limit, only an initial section (in particular the useful range of the fiber can give a sufficient measurement quality. Beyond that initial section, the stimulus pulse and backscatter signal may become too weak (due to the desired nonlinear effects including attenuation) for useful analysis. In an example, the useful range may be 2.5 km. The useful range may be defined as a length of an initial fiber stretch in which the backscatter reaching the detector from a current pulse is sufficiently stronger (e.g. 10 to 50 times as strong) than from older pulses. The signal (intensity of injected light) beyond the useful range may drop significantly (more than just due to regular fiber attenuation) due to nonlinear effects, but the backscatter from previous pulse(s) may decrease much slower, so the ratio becomes less than e.g. 40× (e.g. only 8×) and the measurement quality degrades.

An effective length may be the length of the initial section of the fiber beyond which backscatter from the last pulse is weak enough (such as 10 to 100 times as weak as backscatter from the very beginning of the fiber) to send the next pulse. Taking this definition of the effective length may allow to determine or to set the light pattern rate. The effective length may be same or greater than the useful range of the fiber. Alternatively, given a light pattern rate (or time interval between the first and the second light pattern) an effective length of the fiber may be defined as the section of the fiber from which the backscatter of not more than one light pattern (such as a pulse) at a time propagates back.

Depending on the selection or adjustment of the pulse period (or light pattern injection rate), the useful range may be up to the effective length of the optical fiber.

According to an embodiment of the present invention, only Rayleigh backscatter light is detected and analyzed in order to derive acoustic disturbance, stress, strain, etc. of the optical fiber and infer from that the respective state of the environment of the optical fiber. For example, the optical fiber may be utilized for monitoring an electric cable or a pipeline buried in the ground or to monitor an electric cable or a pipeline at the ground under the sea (i.e., at a seabed or sea floor) or the like.

According to an embodiment of the present invention, the light pattern power of the first coherent light pattern and/or the second coherent light pattern is between 2 times and 50 times, in particular 8 times and 12 times, the power limit. When the light pattern power is selected as defined, a rapid attenuation of the respective intensity of the respective light pattern may be achieved beyond the effective fiber length such that Rayleigh backscatter originating from positions beyond the effective fiber length is so low in intensity that it does not disturb the measurement, in particular does not (or does only to a negligible amount) disturb detection of backscatter light originating from the optical fiber up to the useful range of the optical fiber. If the light pattern power is still larger than for example 40 to 100 times the power limit, propagation of the light may be severely deteriorated and may not be predictable anymore even by theory treating nonlinear effects of electromagnetic processes.

According to an embodiment of the present invention the light pattern energy is given as an integral of radiant flux (energy per time) entering the optical fiber over the length of the light pattern, the radiant flux being the flux of the Poynting vector through the propagation cross-section of the optical fiber, wherein the time length of (one period of) the first and/or second light pattern is between 10 ns and the round trip time corresponding to the useful fiber length.

According to an embodiment of the present invention the light pattern power is adjusted to enable acoustic sensing over a desired effective fiber length shorter than a physical fiber length, in particular shorter than ⅔ of the physical fiber length, wherein the effective fiber length is given by a distance from a light entry position into the fiber to a (smallest) position in the fiber at which the light power/intensity is attenuated to be lower than a threshold, the threshold being 1/10 or 1/40 or less of the injected light power.

Depending on the light pattern power the incident light pattern or light is attenuated (e.g. due to scattering processes and other interaction processes) so that the intensity of the original forward propagating light (having the same wavelength as the injected light pattern) and the corresponding backscattered light (Rayleigh or other elastic backscatter as described) rapidly decreases. Backscatter originating from fiber regions beyond the effective fiber length may only marginally disturb detected intensity of backscatter from fiber regions up to the useful fiber length.

The effective fiber length may decrease with increasing light pattern power. Thus, adjusting the light pattern power, allows to adjust the corresponding effective fiber length. In turn, the repetition period for the first and second light pattern may be adjusted in dependence of the adjusted effective fiber length (or light pattern power). The smaller the effective fiber length is adjusted, the higher the repetition rate of the acoustic sensing can be selected. These parameters, in particular the effective fiber length and/or the desired repetition rate (i.e. the acoustic bandwidth) can thereby be adjusted according to the requirements of the particular application.

According to an embodiment of the present invention, a time difference between injecting the first light pattern and injecting the second light pattern is adjusted to be at least two times the effective fiber length divided by the speed of light within the optical fiber.

When the time difference between injecting the first light pattern and injecting the second light pattern is at least twice (to account for forward and back propagation) the effective fiber length divided by the speed of light within the optical fiber, it may be assured that backscatter of only one light pulse or one light pattern is within the effective fiber length at a time. Thereby, the acoustic state of the optical fiber (and thereby also the acoustic state of the environment of the optical fiber) up to the effective fiber length, may accurately be measured using the method, since superimposing of disturbing light may be sufficiently weak.

According to an embodiment of the present invention the light pattern power is adjusted to allow or achieve a desired acoustic sensing sampling rate or desired time difference between injecting the first light pattern and the second light pattern. In order to achieve a relatively high acoustic sensing sampling rate, the light pattern power may be increased. In order to achieve a longer effective length with lower acoustic sensing sampling rate, the light pattern power may be reduced. Thus, important measurement parameters may be the definition of the light pattern power and the definition of the acoustic sensing sampling rate. These measurement parameters may be adjusted depending on the particular application.

According to an embodiment of the present invention the first coherent light pattern and the second coherent light pattern are composed of light having substantially the same light characteristics, in particular including: the first light pattern and the second light pattern is composed of light having same wavelength or wavelength range and/or light having the same polarization state. The first and the second light patterns may be indistinguishable regarding wavelength and polarization state as well as other optical characteristics. Thereby, no complex filters or other means for distinguishing or separating the backscattered first and backscattered second light are required for performing the method, thereby simplifying the method and the respective arrangement.

But such coding methods can be combined with the present invention. Embodiments may involve e.g. to inject two or more variants of first and second light patterns, the different variants having different wavelengths. For each variant the light pattern power may be above the nonlinear effect related power limit and the light pattern rate (or inverse of the time interval between the first and the second light pattern) may be higher than conventionally employed.

According to an embodiment of the present invention the first light pattern and the second light pattern have substantially a same width and/or amplitude and/or intensity profile, in particular each comprising a single pulse or a double pulse. For example, an acousto-optic modulator may be utilized to define the first and second light patterns. When the first and second light patterns are substantially the same, the method may further be simplified.

According to an embodiment of the present invention, the method further comprises injecting a periodically repetitive light pattern sequence including the first and the second light pattern, wherein a repetition period is shorter than two times the length of the optical fiber divided by the speed of light within the optical fiber. When the repetitive light pattern sequence (e.g. a sequence of equally spaced apart equal light patterns) is injected over a period of time, the optical fiber may be monitored regarding its strain, stress, acoustic disturbance in a time-dependent manner. The repetition period may substantially be (or greater than) two times the effective length of the fiber divided by the speed of light within the optical fiber. Thereby, high acoustic bandwidths of monitoring the optical fiber may be achieved.

According to an embodiment of the present invention, the method further comprises analyzing the detected light, to determine, over the effective fiber length (or at least over the useful range of the fiber length) of optical fiber at least one of: strain, stress, acoustic disturbance, temperature, temperature gradient, temperature spatial and/or temporal change. Thereby, optical distributed acoustic sensing having a high acoustic bandwidth is achieved.

According to an embodiment of the present invention, before detecting the first and second Rayleigh backscatter light the respective backscatter light is in particular interfered with reference light of same or shifted optical frequency. Thereby, conventionally applied methods may be supported, without substantially changing or extending the required hardware.

According to an embodiment of the present invention, it is provided a method of fiber optical distributed acoustic sensing, the method comprising: switching between a high rate fiber optical distributed acoustic sensing (as described above) and a low rate fiber optical distributed acoustic sensing (e.g. according to prior art), the low rate fiber optical distributed acoustic sensing comprising: injecting another first light pattern into the optical fiber; detecting another first Rayleigh backscatter light; injecting another second light pattern into the optical fiber after all the other first Rayleigh backscatter light has left the optical fiber; detecting another second Rayleigh backscatter light, wherein the other first coherent light pattern and the other second coherent light pattern have a light pattern power not exceeding the power limit where nonlinear effects of propagation occur.

Thereby, in at least a limited region of the optical fiber, high rate optical distributed acoustic sensing is enabled, if desired. Furthermore, to monitor the entire optical fiber at a conventional acoustic bandwidth and acoustic dynamic range, the conventional DAS may be utilized or performed, in particular using the same hardware as has been used for the high rate fiber optical distributed acoustic sensing. Thereby, a high flexibility of monitoring the state of the optical cable is provided.

It should be understood that features, individually or in any combination, disclosed, described, explained or provided for, a method of high rate fiber distributed acoustic sensing, may, individually or in any combination, also be applied to an arrangement for high rate fiber optical distributed acoustic sensing according to an embodiment of the present invention and vice versa.

According to an embodiment of the present invention, it is provided an arrangement for high rate fiber optical distributed acoustic sensing, the arrangement comprising: an optical fiber; a light launch module adapted to inject a first coherent light pattern into an optical fiber and to inject a second coherent light pattern into the optical fiber while first Rayleigh backscatter light of the first light pattern is propagating in the optical fiber, wherein the first coherent light pattern and the second coherent light pattern have a light pattern power above a power limit where nonlinear effects of propagation occur; and a detector adapted to detect the first Rayleigh backscatter light and to detect second Rayleigh backscatter light of the second light pattern, in particular further comprising: a processor adapted to analyze the detected light.

The arrangement may further be adapted for low-rate fiber optical distributed acoustic sensing, thereby using essentially the same hardware. Thereby, only shaping the light to result in the appropriate first and second light patterns, may be different in the high rate and the low-rate fiber optical distributed acoustic sensing. Other method steps or processes, like the detection and/or processing and/or analyzing may substantially be performed in a similar or same manner.

DETAILED DESCRIPTION OF ILLUSTRATED EMBODIMENTS

Figure 1:
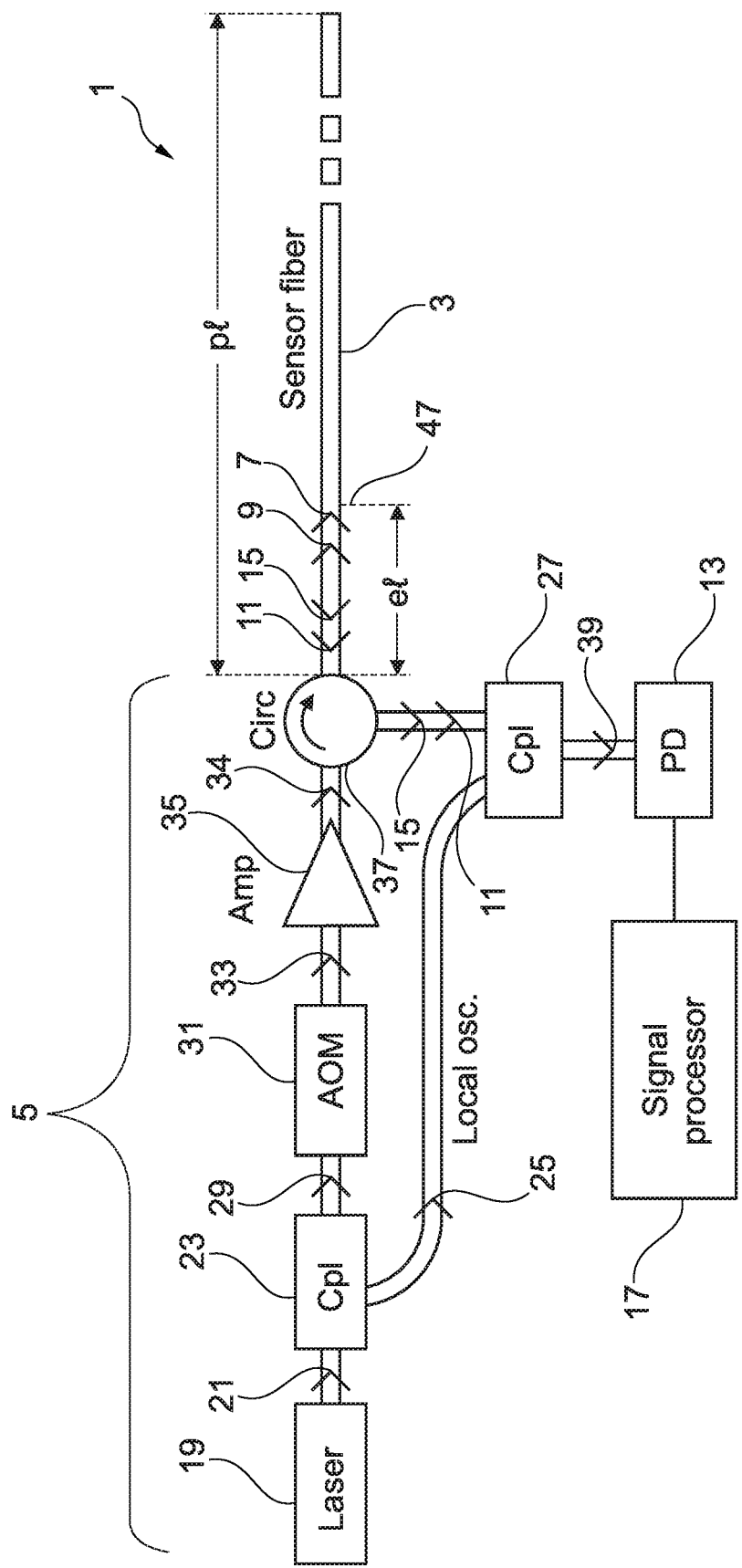
FIG. 1 schematically illustrates an arrangement for high rate fiber optical distributed acoustic sensing according to an embodiment of the present invention.

The embodiments of the present invention are now described with reference to the accompanying drawings. The invention is not limited to the illustrated or described embodiments.

The arrangement 1 adapted for high rate fiber optical distributed acoustic sensing according to an embodiment of the present invention comprises an optical fiber 3 which may be used to monitor the environment of the optical fiber 3 (for example an electric cable or a pipeline buried in the ground or arranged at or below a sea bottom) for acoustic disturbances and/or strain and/or stress, etc. The arrangement 1 further comprises a light launch module 5, which is adapted to inject a first coherent light pattern 7 into the optical fiber 3 and (at a later point in time) inject a second coherent light pattern 9 into the optical fiber 3, while a first Rayleigh backscatter light 11 of the first light pattern 7 is propagating in the optical fiber 3 (in the opposite direction).

Furthermore, the arrangement 1 comprises a detector 13, which is adapted to detect the first Rayleigh backscatter light 11 and to detect (at a later time) second Rayleigh backscatter light 15 of the second light pattern 9. The arrangement 1 further comprises a processor 17, which is adapted to receive the measurement signals of the detection from the detector 13 and to analyse the detected light.

In the illustrated embodiment, the arrangement 1 comprises a laser 19, which generates a coherent light beam 21 (for example visible light or infrared light), which is supplied to an optical coupler 23 which splits off from the coherent light 21 a reference light beam 25 (also called a local oscillator), which is conveyed within an optical fiber to another coupler 27. A portion 29 of the coherent light 21 is supplied to an acousto-optic modulator 31, which forms from the continuous light stream 29 a repetitive light pattern 33 characterized by a particular intensity profile over time which is repeated over time, in order to form the first coherent light pattern 7 and also the (identical or same) second coherent light pattern 9. These are in particular formed upon passing the patterned light 33 further through an optical amplifier 35 and passing through a circulator 37 and enter the optical fiber 3 as repetitive light pattern 34.

The backscattered light, i.e. the first Rayleigh backscatter light 11 and the second Rayleigh backscatter light 15, return via the circulator 37 to the second coupler 27, where they are superimposed with the reference beam 25. The interfered light 39 is incident on the detector 13 and the respective intensity is detected by the detector 13 (in particular a photodiode or photo detector).

The arrangement 1 illustrated in FIG. 1 is adapted to carry out a method of high rate fiber optical distributed acoustic sensing according to an embodiment of the present invention and is further adapted to carry out a conventional fiber optical distributed acoustic sensing. For performing the high rate fiber optical distributed acoustic sensing, the signal processor 17 or a dedicated controller may for example control the laser light source 19 and/or the acousto-optical modulator 31 and/or the acoustic amplifier 35 in order to shape the respective coherent light beams to result in desired coherent light pattern and also to result in the coherent light pattern to have a desired light pattern power.

In particular, the first coherent light pattern 9 as well as the second coherent light pattern 9 are both formed from (or comprise) a single pulse (for example rectangular pulse of Gauss-shaped pulse) but could have more complex intensity profile, like comprising a double pulse. The first and second light patterns 7, 9 are comprised of light having same wavelengths. In other embodiments, a light pattern may contain pulses of slightly different optical frequencies or even more complicated patterns than a single pulse. The first and second light patterns are sent with a certain lag in between (separation time interval) into the fiber. In particular, the first and second light pattern are members of a repetitive light pattern sequence 34 injected into the optical fiber 3, the sequence comprising equally timely spaced apart (equal) light patterns. Thus, same light patterns are injected with a certain rate. According to an embodiment of the present invention, the light pattern or each pulse of the repetitive light pattern has a substantially same characteristic regarding same wavelength, frequency, polarization, power profile.

Although embodiments of the present invention may merely require the first and second light patterns having the same optical characteristics, other embodiments may apply light patterns having different optical characteristics, like different wavelengths. In particular, multi-wavelength approaches may be supported, i.e. they have several pulses of same launched characteristics in the fiber and doing that for a multiple wavelength at the same time. Thereby pulse rate may even be increased.

Figure 2:
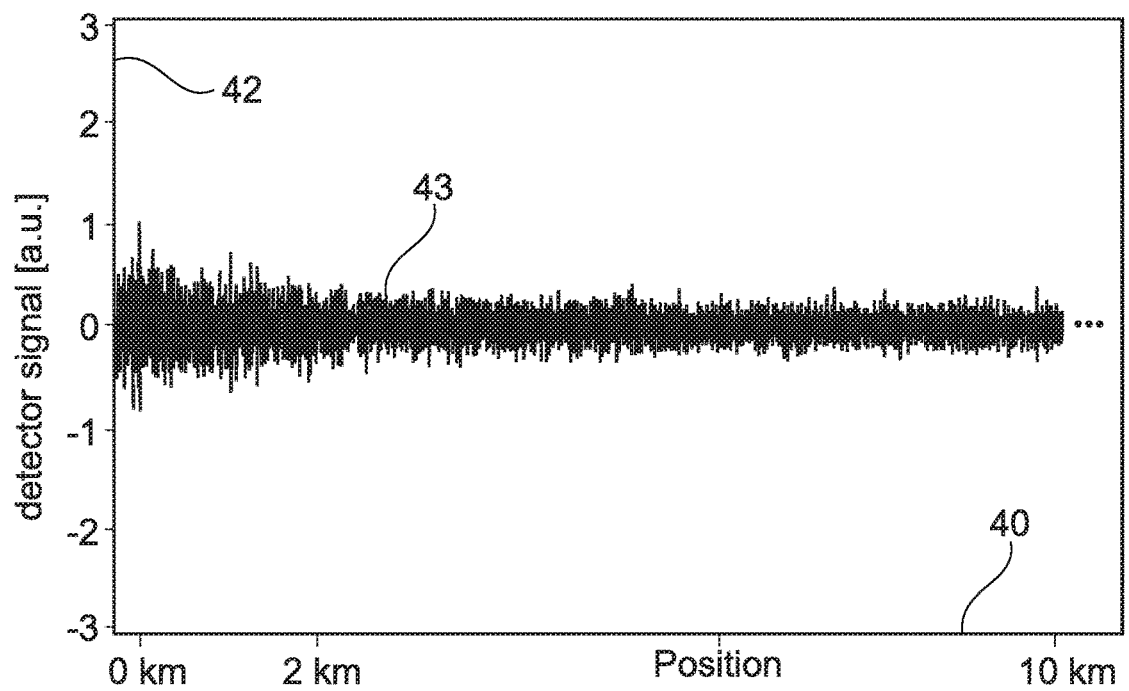
FIGS. 2 and 3 illustrate graphs showing a detector signal when, respectively, a conventional light pattern power or a light pattern power above a power limit as applied in embodiments of the present invention, is utilized.
Figure 3:
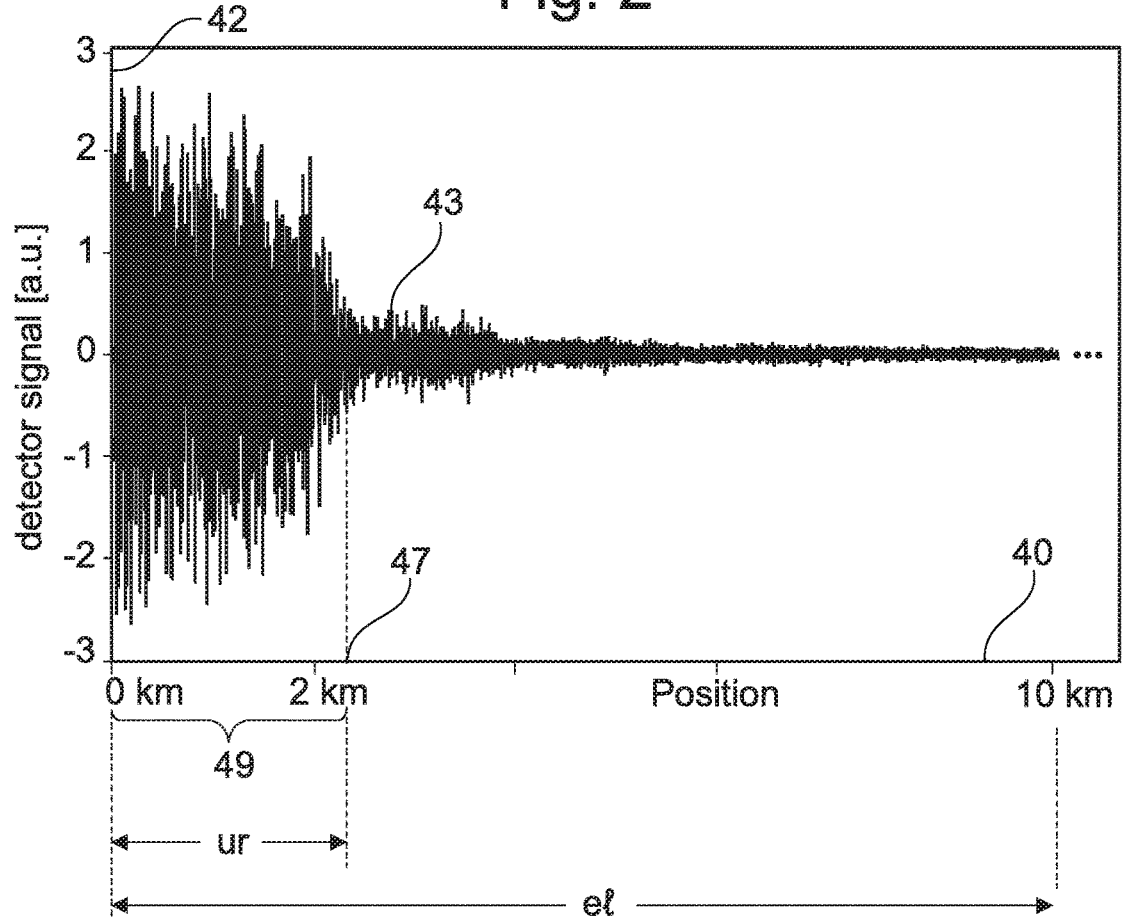

FIG. 2 illustrates a graph having an abscissa 40 indicating the position and having an ordinate 42 indicating the detector signal of a detector signal 43 when a light pattern having a normal light pattern power, i.e. not exceeding a power limit, where nonlinear effects of propagating occur, is injected into the fiber 3. In contrast, FIG. 3 illustrates a graph in a same coordinate system as a detector signal 45, when a light pattern having a light pattern power above a power limit, where nonlinear effects of propagating occurs, is injected into the fiber 3. As can be appreciated from FIG. 2, the envelope of the curve 43 decreases slowly due to the fiber attenuation for larger position. When the high light pattern power is injected (FIG. 3, curve 45), the envelope of the curve 45 significantly decreases after a few kilometers due to nonlinear effects of light propagation, reducing the detector signal after few km even below the case of normal incident light power.

Near position 47 (around 2.5 km from the beginning of the optical fiber apart) the intensity of the backscatter detector signal has decreased significantly e.g. to about ⅕ to ¹⁄₁₀ of the detector signal as received from backscatter light at the very beginning of the optical fiber. Backscatter light from positions beyond the position 47 may only marginally disturb the measurement results relating to optical disturbance at positions up to the position 47, i.e. in a region 49 having length 'ur' denoting a useful range of the fiber. The position 47 depends on the actually applied light pattern power and may decrease for increasing light pattern power. Within the useful range of the fiber the fiber may be accurately monitored with high bandwidth.

In the illustrated example, the light patterns have a wavelength of 1550 nm and the light pattern power of the experiments relating to FIG. 3 have a ten times as high light pattern power as employed in the experiments relating to FIG. 2. Thus, depending on the applied light pattern power, a useful range 'ur' may be defined based on the position 47 of steep decrease of the detector signal as is apparent from FIG. 3. The useful range 'ur' is smaller than the effective fiber length 'el', e.g. smaller than ⅔ or even ½ of 'el'. The physical length is 50 km in this example.

Figure 4:
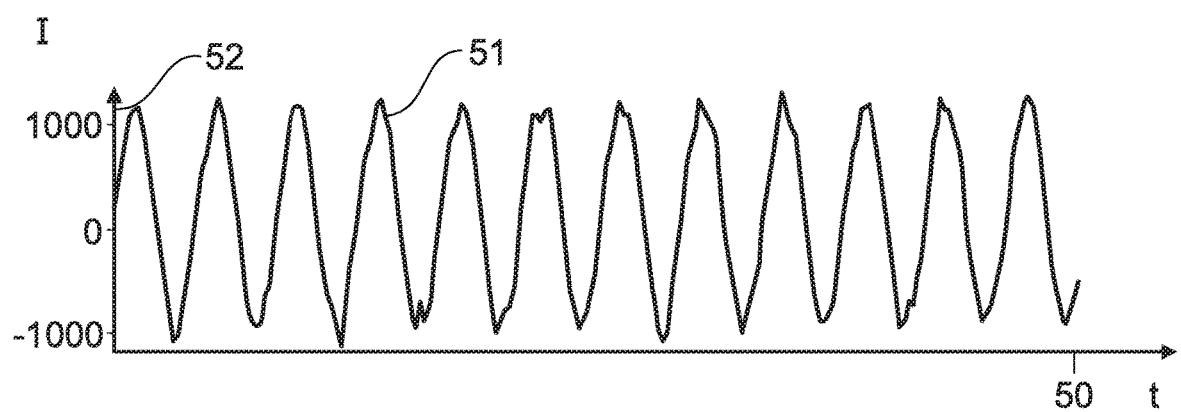
FIGS. 4 and 5 illustrate measurement results of detected signals for a moderate acoustic disturbance according to a conventional DAS method.
Figure 5:
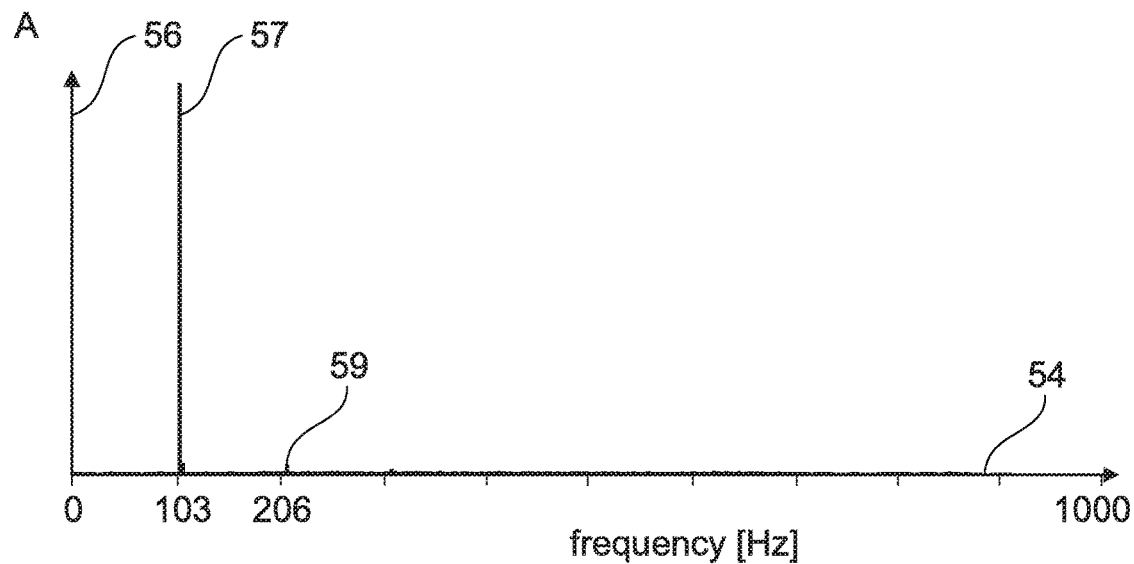

FIGS. 4 and 5 illustrate measurement result when performing a conventional DAS monitoring also supported by embodiments of the present invention. Thereby, a standard single mode sensor fiber of length 50 km (equal to the physical length) was interrogated with a conventional pulse rate of 2 kHz and an (conventional) optical pulse power of about 0.3 W at 1550 nm. An acoustic strain stimulus was applied along a one-meter section of the fiber at position 2 km with a frequency of 103 Hz by a piezo-transducer driven by a function generator with 1 V peak-to-peak-voltage and said frequency. The pulse-to-pulse optical phase change on the DAS detector in this mode is as required within the +/−pi range. Therefore, the sine signal can be restored by a phase unwrapping, as is illustrated in FIG. 4 having an abscissa 50 indicating the time and having an ordinate 52 indicating the amplitude. FIG. 5 illustrates the Fourier transform in a coordinate system having an abscissa 54 indicating the frequency and having an ordinate 56 indicating the amplitude of the respective frequency component. The peak 57 correctly shows the sine oscillation having a frequency of 103 Hz. A first harmonic peak 59 having double the frequency of 206 Hz is also visible but has very low amplitude.

Figure 6:
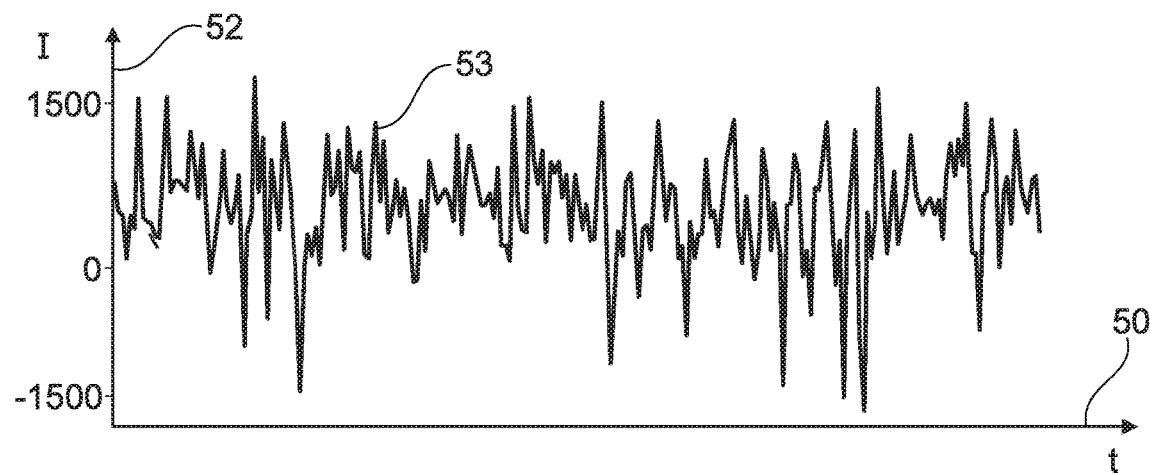
FIGS. 6 and 7 illustrate measurement results of conventional DAS method when a high acoustic disturbance amplitude is applied close to the fiber.
Figure 7:
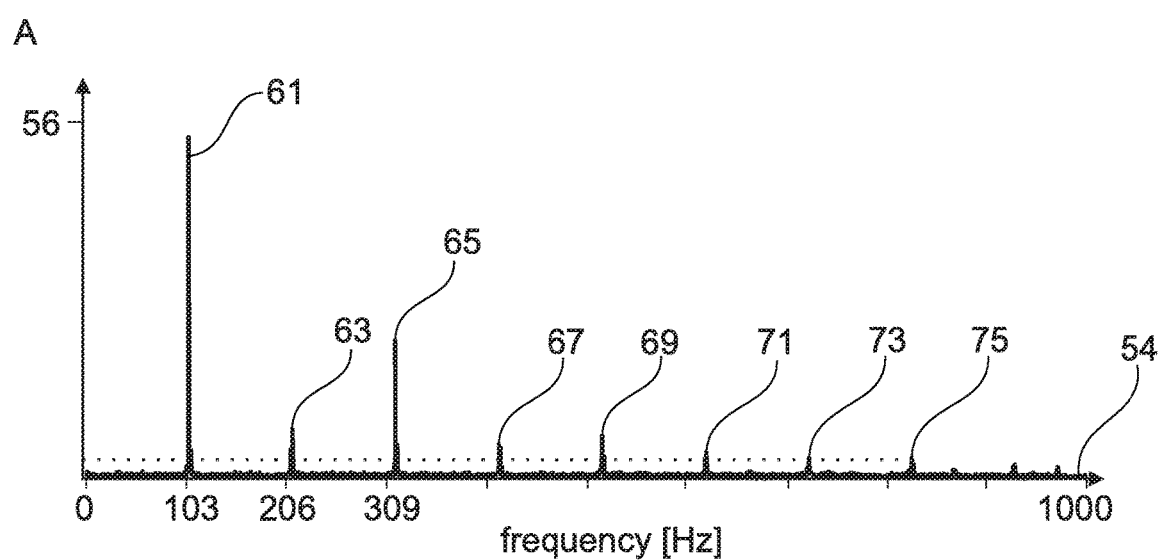

If however the acoustic disturbance is increased in its strength, the conventional method as successfully applied for the former scenario is not capable any more of properly detecting the acoustic disturbance, as is illustrated in FIGS. 6 and 7. Thereby, FIGS. 6 and 7 are analogous to FIGS. 4 and 5 representing the measurement results when the piezo-driver amplitude is increased from 1 V to 5 V leading to exceeding the +/−pi optical phase change criteria from pulse-to-pulse of the detector, which destroys the possibility to unwrap unambiguously the acoustic sine signal, as can be taken from FIG. 6, trace 53. Trace 53 does not represent a sine wave and correspondingly the Fourier transform illustrated in FIG. 7 improperly comprises besides the frequency component peak 61 (at 103 Hz) further peaks 63, 65, 67, 69, 71, 73, 75 and so on having frequencies being multiples of the base frequency of 103 Hz, although these harmonic frequencies were not comprised in the stimulus.

Figure 8:
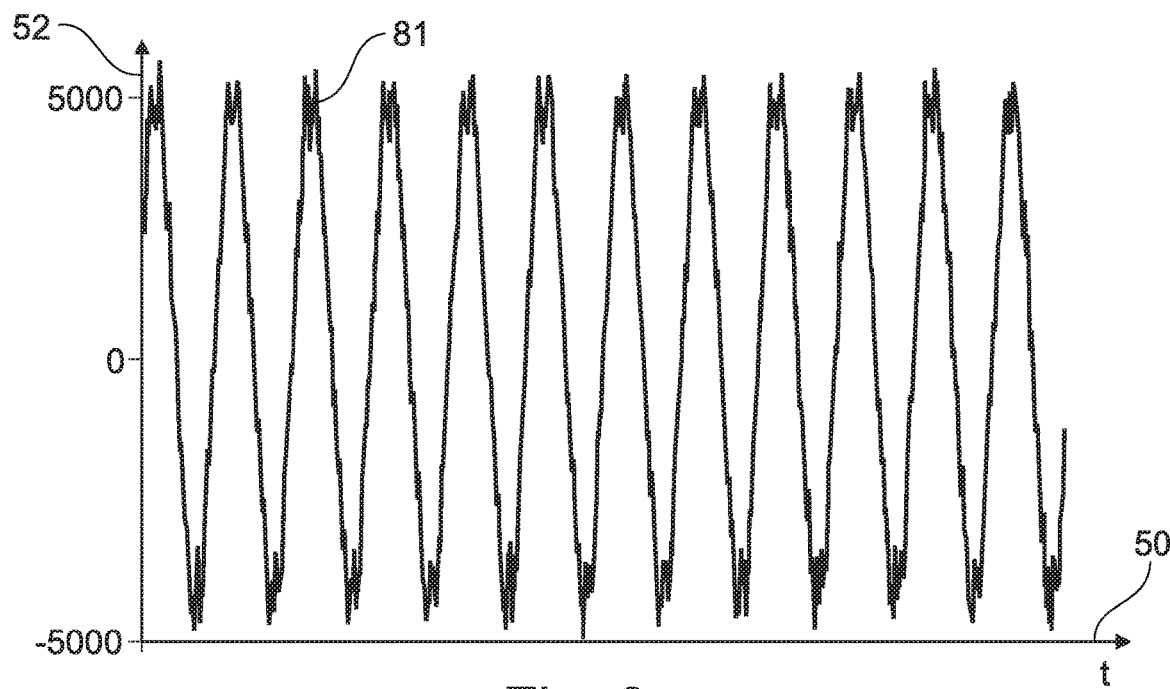
FIGS. 8 and 9 illustrate measurement results of a method of high rate fiber optical distributed acoustic sensing according to an embodiment of the present invention as result for the same high acoustic disturbance as applied in cases of FIGS. 6 and 7.

In order to successfully perform phase unwrapping, a method of high rate fiber optical distributed acoustic sensing according to an embodiment of the present invention is performed, for example by the arrangement 1 illustrated in FIG. 1, as is described with reference to FIGS. 8 and 9. Herein, the pulse power is increased from 0.3 W to 3 W (being above the nonlinear effect related power limit, where nonlinear effects of propagation occur). Furthermore, the pulse rate has been increased from 2 kHz to 10 kHz (thus using five times the conventional pulse rate). As can be taken from the trace 81 in FIG. 8 illustrating the detector signal, a sine wave is recovered although having disturbed peak regions. The Fourier transform of trace 81 illustrated in FIG. 9 comprises the expected frequency component peak 83 having the frequency of 103 Hz and further comprises very low amplitude side peaks 85.

Figure 9:
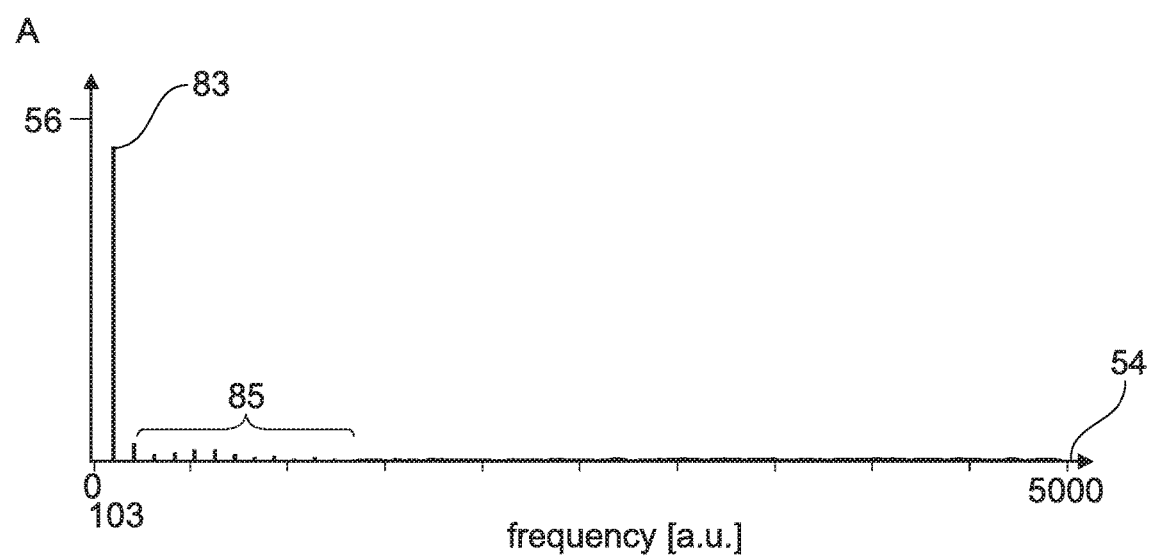

As can be taken from FIGS. 8 and 9, the high strength stimulus can be restored. The overtones 85 stay on a very low level while at the same time the acoustic bandwidth is increased from 1000 Hz (conventional method) to 5000 Hz.

As has been mentioned above, the arrangement 1 is adapted to perform a high rate optical distributed acoustic sensing method as well as a low-rate fiber optical distributed acoustic sensing method, thereby in particular utilizing the same hardware. It should be appreciated that the method does not require any distinguishing or separation of different light patterns or different backscattered light using a filter. Nevertheless, the bandwidth can be increased compared to a conventional DAS method.

The invention claimed is:

1. A method of high rate fiber optical distributed acoustic sensing, the method comprising:
    injecting a first coherent light pattern into an optical fiber;
    injecting a second coherent light pattern into the optical fiber while first Rayleigh backscatter light of the first light pattern is propagating in the optical fiber, wherein the first coherent light pattern and the second coherent light pattern have a light pattern power above a nonlinear effect related power limit;
    detecting the first Rayleigh backscatter light; and
    detecting second Rayleigh backscatter light of the second light pattern,
    wherein the first light pattern and the second light pattern are composed of at least one of light having a same wavelength and light having a same polarization state.

2. The method according to claim 1,
    wherein at least one of the light pattern power of the first coherent light pattern and the light pattern power of the second coherent light pattern is between 2 times and 50 times the nonlinear effect related power limit.

3. The method according to claim 1,
    wherein the light pattern energy is given as an integral of radiant flux entering the optical fiber over the length of the light pattern, the radiant flux being the flux of the Poynting vector through the propagation cross-section of the optical fiber,
    wherein the time length of at least one of the first and second coherent light pattern is between 10 ns and the round-trip time corresponding to a useful fiber length.

4. The method according to claim 1,
    wherein the light pattern power is adjusted to enable acoustic sensing over a useful range of the fiber length equal to or shorter than an effective fiber length and shorter than a physical fiber length,
    wherein the effective fiber length is given by a distance from a light entry position into the fiber to a position in the optical fiber at which the light power is attenuated to be lower than a threshold, the threshold being at most 1/10 of the injected light power.

5. The method according to claim 1,
    wherein a time difference between injecting the first coherent light pattern and injecting the second coherent light pattern is adjusted to be at least two times an effective fiber length divided by the speed of light within the optical fiber.

6. The method according to claim 1,
    wherein the light pattern power is adjusted to achieve one of a desired acoustic sensing sampling rate and a desired time difference between injecting the first coherent light pattern and the second coherent light pattern.

7. The method according to claim 1,
    wherein the first coherent light pattern and the second coherent light pattern are composed of light having substantially a same amplitude.

8. The method according to claim 1,
    wherein the first coherent light pattern and the second coherent light pattern have substantially at least one of a same width and a same intensity profile.

9. The method according to claim 8,
    wherein the first coherent light pattern and the second coherent light pattern each comprises one of a single pulse and a double pulse.

10. The method according to claim 1, further comprising:
    injecting a periodically repetitive light pattern sequence including the first and the second coherent light pattern, wherein a repetition period of the repetitive light pattern sequence is shorter than two times the physical length of the optical fiber divided by the speed of light within the optical fiber.

11. The method according to claim 1, further comprising:
    analyzing the detected light, to determine, over a useful range of optical fiber, at least one of: a strain, a stress, an acoustic disturbance, a temperature, a temperature gradient, a temperature spatial change, and a temperature temporal change.

12. The method according to claim 1, configured as a coherent optical time domain reflectometry method.

13. The method according to claim 1,
    wherein before detecting the first and second Rayleigh backscatter light the respective backscatter light is an interfered with reference light.

14. A method of fiber optical distributed acoustic sensing, the method comprising:
    switching between a high-rate fiber optical distributed acoustic sensing and a low-rate fiber optical distributed acoustic sensing,
    the high-rate fiber optical distributed acoustic sensing comprising:
        injecting a first coherent light pattern into an optical fiber;
        injecting a second coherent light pattern into the optical fiber while first Rayleigh backscatter light of the first light pattern is propagating in the optical fiber,
        wherein the first coherent light pattern and the second coherent light pattern have a light pattern power above a nonlinear effect related power limit;
        detecting the first Rayleigh backscatter light; and
        detecting second Rayleigh backscatter light of the second light pattern;
    the low-rate fiber optical distributed acoustic sensing comprising:
        injecting another first light pattern into the optical fiber;
        detecting another first Rayleigh backscatter light;
        injecting another second light pattern into the optical fiber after all the other first Rayleigh backscatter light has left the optical fiber;
        detecting another second Rayleigh backscatter light, wherein the other first coherent light pattern and the other second coherent light pattern have a light pattern power not exceeding the nonlinear effect related power limit, wherein the first coherent light pattern and the second coherent light pattern are composed of at least one of light having a same wavelength and light having a same polarization state.

15. An arrangement for fiber optical distributed acoustic sensing, the arrangement comprising:
- an optical fiber;
- a light launch module including at least one of a laser, an optical coupler, an acoustic-optic modulator, an optical amplifier and a circulator, the light launch module being adapted to inject a first coherent light pattern into an optical fiber and to inject a second coherent light pattern into the optical fiber while first Rayleigh backscatter light of the first light pattern is propagating in the optical fiber,
- wherein the first coherent light pattern and the second coherent light pattern have a light pattern power above a nonlinear effect related power limit and are composed of at least one of light having a same wavelength and light having a same polarization state; and
- a detector adapted to detect the first Rayleigh backscatter light and to detect second Rayleigh backscatter light of the second light pattern.

16. The arrangement according to claim 15, further comprising:
- a processor adapted to analyze the detected light.

17. The arrangement according to claim 15, further adapted for low-rate fiber optical distributed acoustic sensing, thereby using same hardware.

* * * * *